Aug. 17, 1943.       C. I. PRESTON       2,327,062
AIRCRAFT ENGINE MOUNTING
Filed Feb. 15, 1941       7 Sheets-Sheet 4

INVENTOR.
Charles I. Preston
BY
G. F. Hauke
Attorney

Aug. 17, 1943.   C. I. PRESTON   2,327,062
AIRCRAFT ENGINE MOUNTING
Filed Feb. 15, 1941   7 Sheets-Sheet 7

INVENTOR.
Charles I. Preston
BY  L. F. Hauke
Attorney.

Patented Aug. 17, 1943

2,327,062

UNITED STATES PATENT OFFICE 2,327,062

AIRCRAFT ENGINE MOUNTING

Charles I. Preston, Muskegon, Mich., assignor to Continental Motors Corporation, Detroit, Mich., a corporation of Virginia Application February 15, 1941, Serial No. 379,047

9 Claims. (Cl. 248—5)

My invention relates to an aircraft engine and more particularly to an improved means for mounting the engine in an aircraft.

It will be observed that the hereafter described engine mounting is more particularly adapted for supporting an aircraft engine of the aligned cylinder type, and is more especially adapted for use with an aircraft engine of the opposed cylinder type, which is mounted in the nose of the aircraft fuselage ahead of the standard fire wall by which same is supported, as illustrated in one of my modifications.

It will be observed that the mounting of an aircraft engine presents an entirely different problem than the mounting of an industrial or automotive type of engine, particularly since aircraft are flown at steep angles and in positions not had by an automobile, as the planes often are flown in a verticle bank, up-side-down and in steep angles of climb or descent. Also airplanes, when cruising, often encounter abnormal updrafts or downdrafts and are thus subjected to severe conditions which place the engine mounting under severe strain. Landing, and when pulling out of dives, places an unusual strain on the engine mounting. Also, it is absolutely essential that the engine mountings be as light in weight as possible, and to be arranged for location in a relatively limited space. It will thus be quite apparent that the problem of aircraft engine mounting is not one which is readily solved, nor is the same solved by adapting conventional motor mounting practice to the problem.

An object of my present invention is to facilitate the assembly of an aircraft engine in an aircraft, particularly one of the horizontally opposed cylinder type, by providing an improved engine mounting constructed and arranged to provide an engine support capable of continuous service and which will perform satisfactorily under all conditions of aircraft operation.

Another object of my present invention is to provide an improved aircraft engine mounting structure by providing yielding supports compactly arranged and so located as to provide for a maximum absorption of torsional vibrations, vibrations caused by sudden change of direction of flight, and other abnormal operating conditions not encountered in vehicles other than aircraft. The particular mounting herein described and claimed is particularly constructed and arranged for assembly with an aircraft engine and the supports are arranged in a novel manner, same being so located as to provide a maximum of efficiency and to satisfactorily operate with a minimum of maintenance of service over relatively long periods of time under all flying conditions.

For a more detailed understanding of my invention, reference may be had to the accompanying drawings which illustrate preferred embodiments of my invention, in which like characters refer to like parts throughout the several views, and in which:

Fig. 1 is a top plan view of a horizontally opposed cylinder type of aircraft engine and illustrating the cantilever struts for supporting said engine from the fire wall of the aircraft in connection with yielding engine supports, Fig. 2 is a side elevational view thereof, Fig. 3 is a bottom plan view thereof, Fig. 4 is a rear elevational view thereof, Fig. 5 is a bottom plan view of a modified construction which embodies yielding motor supports all of which are located adjacent the bottom of the engine crankcase and below the engine crankshaft.

Fig. 8 is a fragmentary detail section through one of the yielding motor supports.

Referring to the preferred construction illustrated in Figs. 1 to 4 inclusive, it will be noted that I have particularly illustrated my invention in connection with a six cylinder opposed aircraft engine, but it will be obvious that the principles of my invention may be embodied in other types of engines as well. The engine A includes a crankcase 10, a crankshaft 11, cylinder structures 12, a gear case 13, and conventional accessories such as the generator, starter, magneto and other necessary parts which are preferably mounted adjacent the rear end of the engine and driven by suitable gearing (not shown) embodied in the usual manner within the gear case 13.

Figure 1:
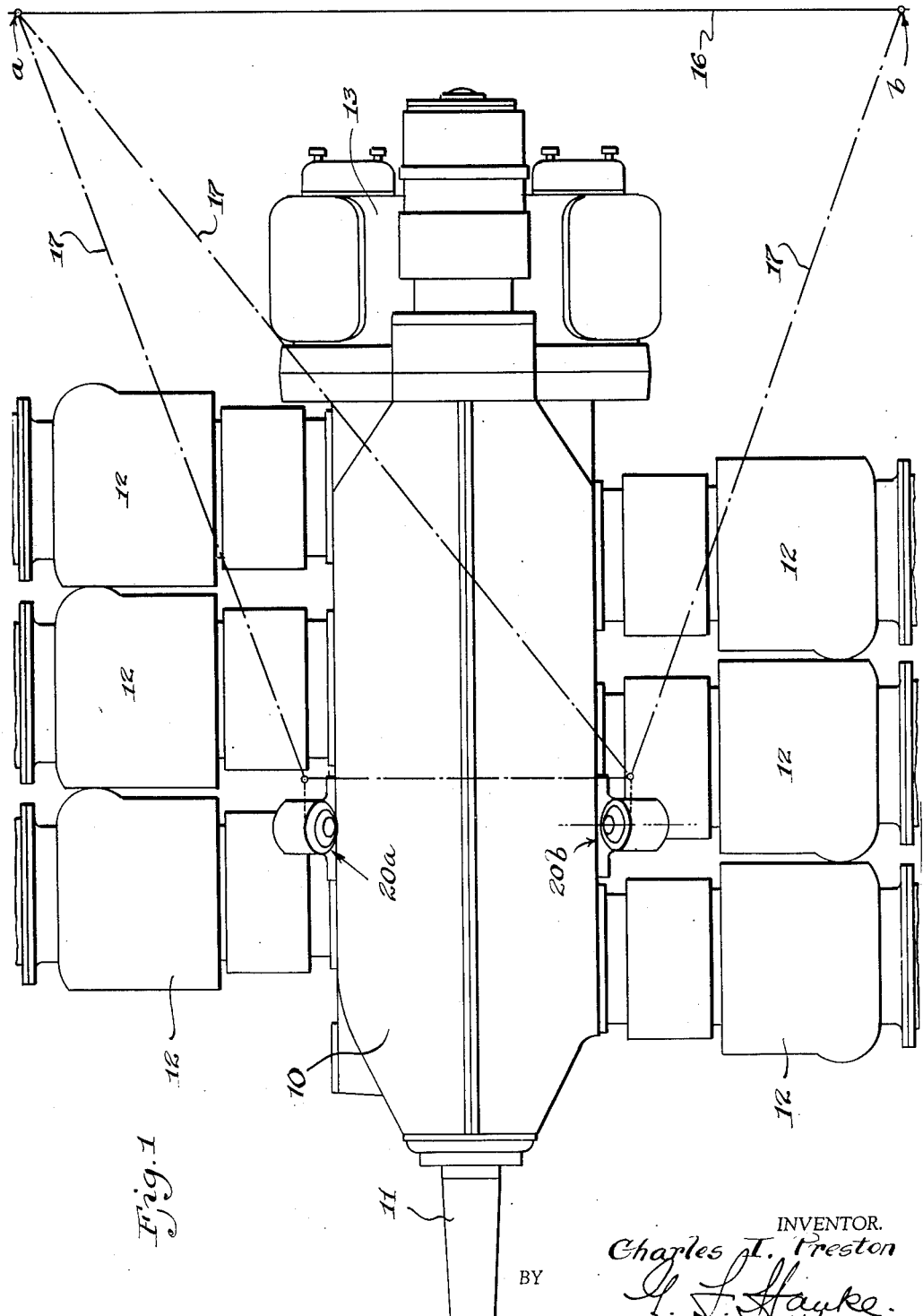
Figure 2:
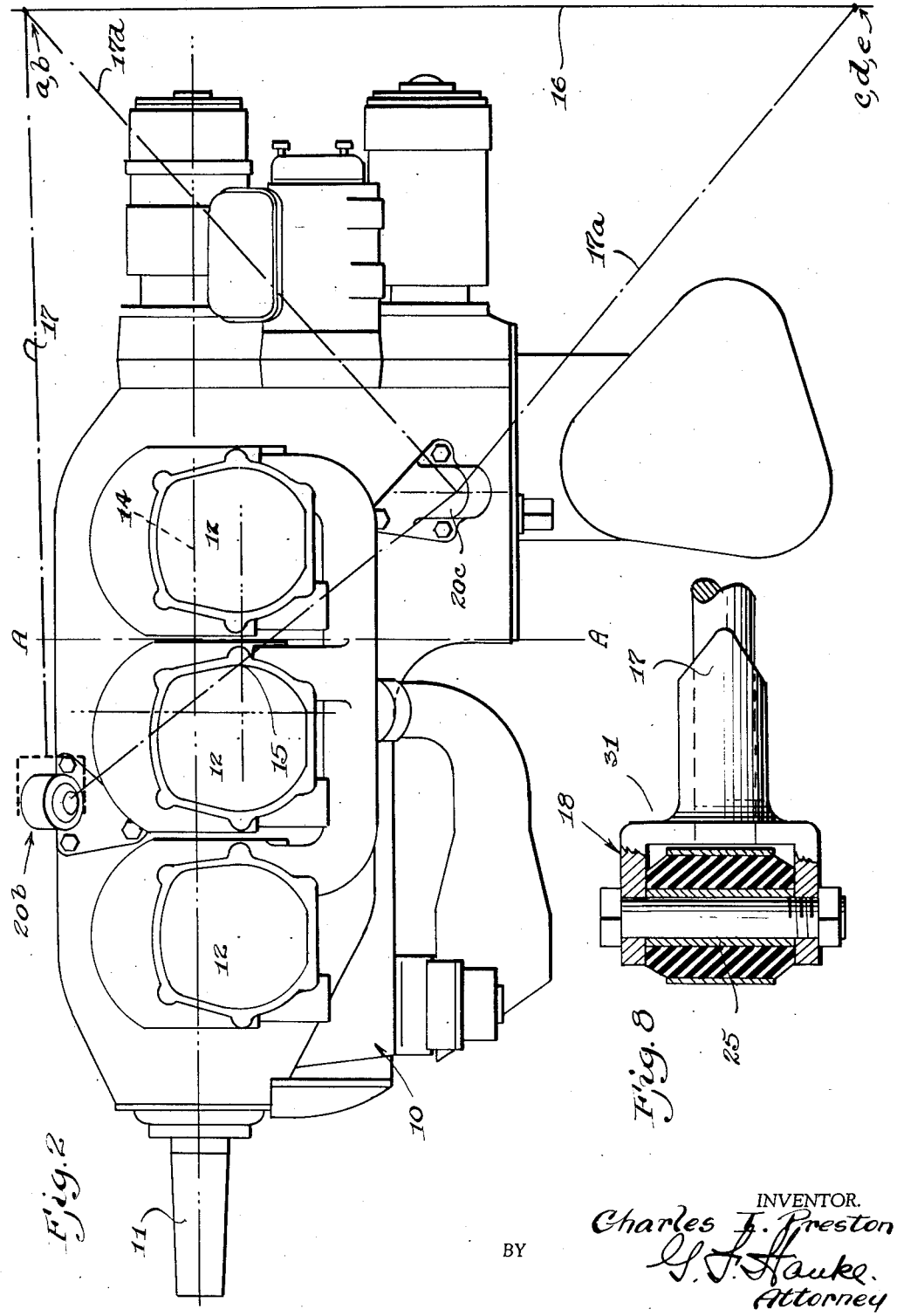

The dotted line 14 in Fig. 2 indicates the crankshaft axis of the engine and point 15 indicates approximately the engine center of gravity. It will be noted that when the engine is viewed from the side, as in Fig. 2, a transverse engine plane passing through the four yielding supports will also substantially pass through the center of gravity of the engine, which point is usually located some distance below the engine crankshaft axis 14.

Figure 3:
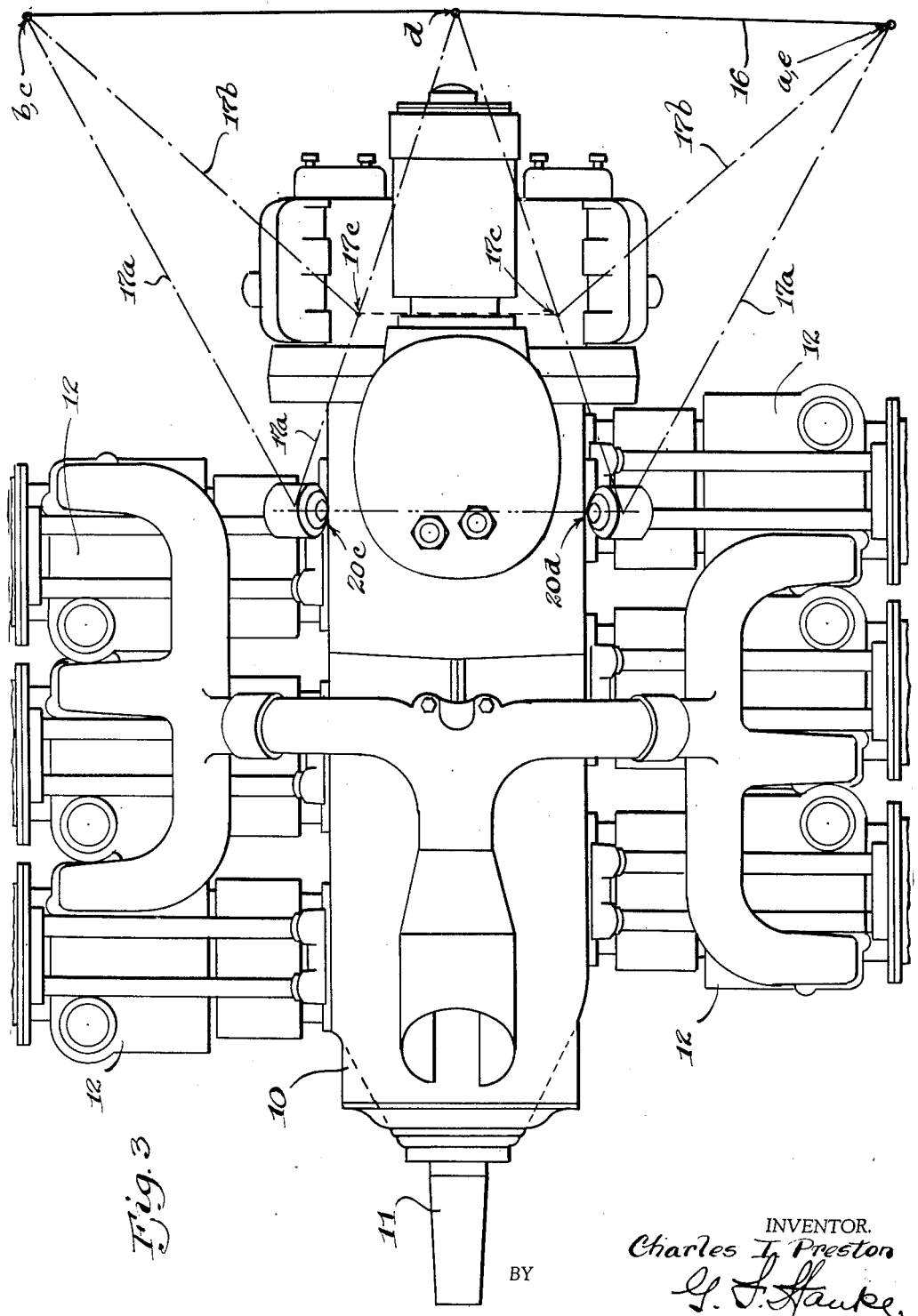
Figure 4:
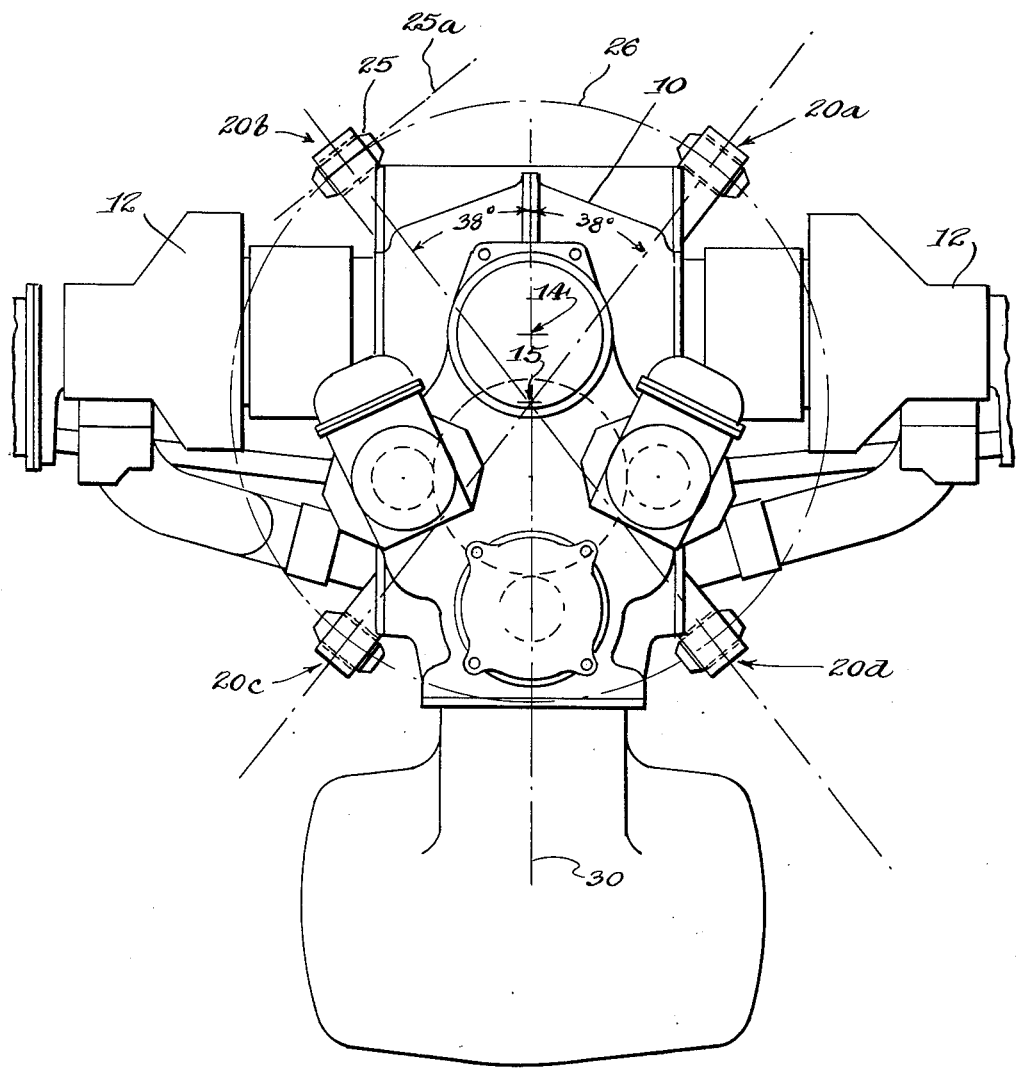

I provide cantilever members or struts 17 anchored at spaced points on the fire wall 16 of the aircraft, and which are preferably connected with the several yielding engine supports by a suitable hinged connection 18. For convenience, I will designate the spaced points (see Fig. 1) to which the struts connecting the upper yielding supports are connected, as a and b. In this particular construction a pair of struts or cantilever members 17 are connected with point a and with the yielding supports 20a and 20b, and another strut or cantilever member 17 connects point b with the yielding motor support 20b. The yielding lower supports 20c and 20d are connected by struts or cantilever members with the upper spaced points a and b and with the lower spaced points c, d and e, all of said points being located on the fire wall 16. This strut or cantilever construction for supporting the lower portion of the engine is illustrated in Fig. 3 and it will be noted that the yielding support 20c is connected by struts 17a with the anchor points c and d while the engine support 20d is connected by struts 17a with the anchor supports d and e. Auxiliary struts 17b are anchored at points c and e and connected or hinged to the struts connected with anchor point d preferably at a point 17c which is substantially midway between the point d and the engine supports 20c and 20d. It will be also observed that I provide struts 17d which connect the engine supports 20c and 20d with the anchor points a and b.

It will be observed that the bushings 25 embodied in these yielding motor or engine supports are so arranged as viewed from the front or rear of the engine (see Fig. 4), as to locate their respective axes 25a tangentially to a circle 26 described about a center and at a predetermined uniform distance therefrom, which center preferably lies in a longitudinal axis contained within a line extending longitudinally of the engine, parallel with the crankshaft engine axis 14, and extending substantially through the center of gravity of the engine as indicated by the point 15. Preferably these yielding supports are all substantially equi-distant from the center of circle 26 and are also angularly spaced from each other at a predetermined distance, but it is found that this angular spacing may be varied considerably, in order to facilitate a compact arrangement without materially affecting the efficiency of the mounting assembly. It will be noted that the angular spacing between the supports 20a and 20b which is substantially equal to the angular spacing of supports 20c and 20d is somewhat less than the angular spacing between supports 20a—20d and 20b—20c. This particular wider spacing in a vertical plane serves to adequately resist more abnormal strains resulting from particularly rough landings of the aircraft or when pulling out of a dive. It will also be observed that half of the supports are located to one side of the central longitudinal engine plane 30 containing the crankshaft axis 14, while the other half of the supports are laterally spaced substantially a like distance to the other side of this plane 30. I refer to the supports 20a and 20b as the upper supports, and it may be observed that the upper supports are spaced longitudinally of the engine forwardly of the center of gravity 15 while supports 20c and 20d are referred to as the lower supports, and are spaced substantially a like distance longitudinally of the engine and rearwardly from the center of gravity 15.

In all cases, I preferably hinge the various cantilever members or struts to these yielding supports by means of a hinged connection such as a yoke or bracket 31 as illustrated in Fig. 8.

Figure 5:
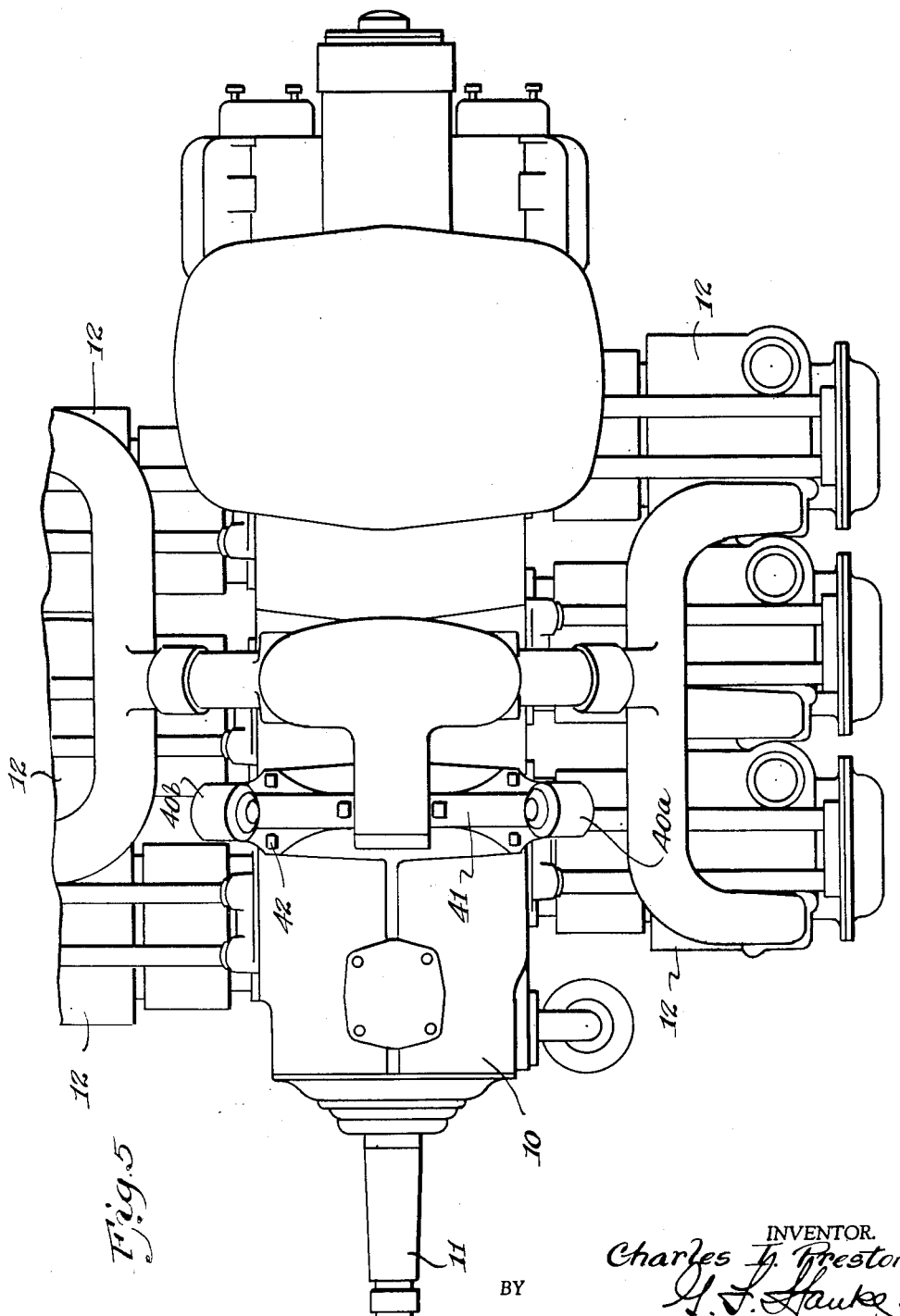
Figure 6:
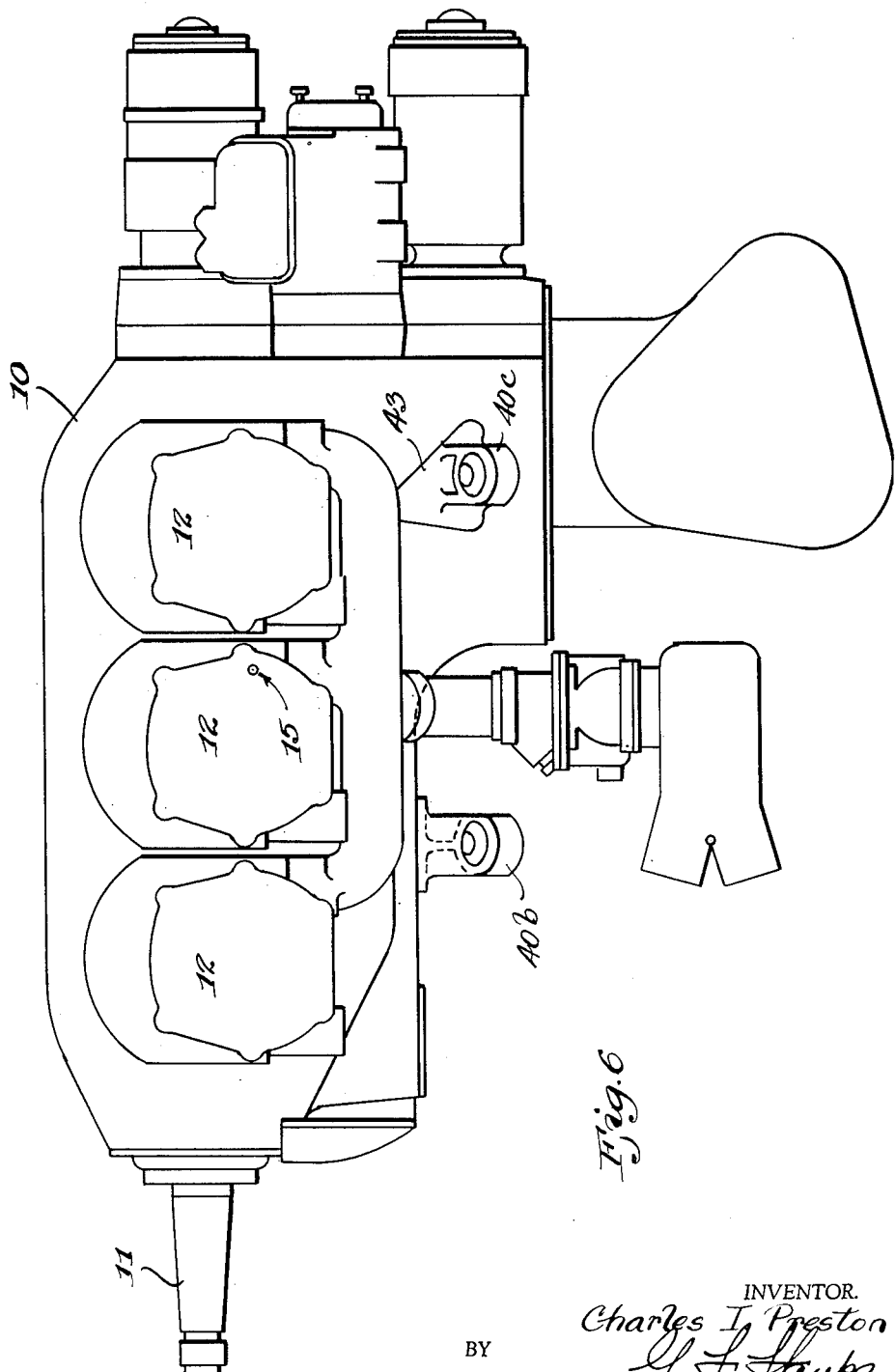
Fig. 6 is a side elevational view thereof.
Figure 7:
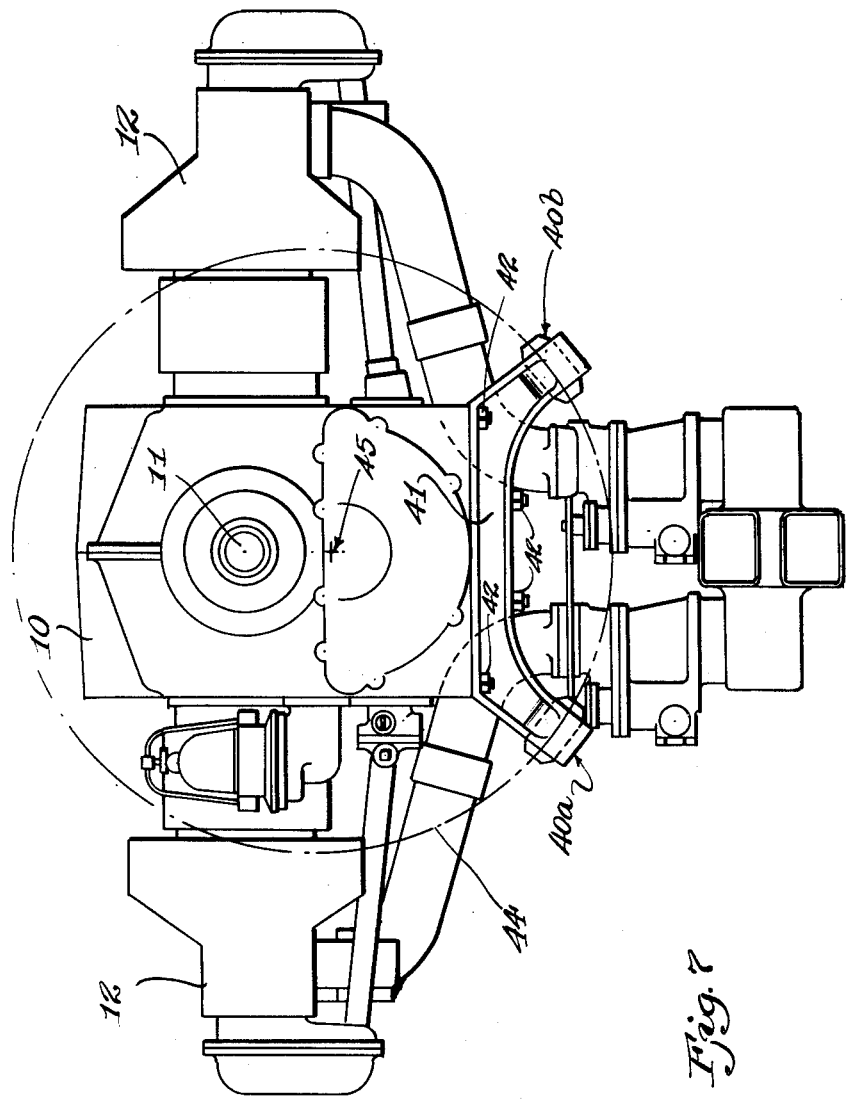
Fig. 7 is a front elevational view thereof.

In the modified construction illustrated in Figs. 5 to 7 inclusive, I have illustrated an aircraft engine mounting construction in which all of the yielding engine supports are located preferably in a common horizontal plane extending below and parallel with the engine crankshaft axis 14. The forward yielding engine supports 40a and 40b are preferably carried by a transverse beam or member 41 which is bolted or otherwise secured to the underneath side of the engine crankcase by bolts or other suitable fastening device 42. The pair of yielding motor supports 40c are supported on brackets 43 secured to the engine crankcase to each side of the central longitudinal vertical engine plane, and preferably longitudinally aligned respectively with the supports 40a and 40b. These supports may be connected by suitable struts with the fire wall 16 or by any other suitable means, but are usually connected with a convenient truss or fuselage structure extending longitudinally of the aircraft fuselage. It will be observed that the forward supports 40a and 40b are longitudinally spaced forwardly of the center of gravity 15 of said engine, while the supports 40c are preferably spaced a like distance to the rear of the center of gravity 15 of said engine, and these yielding motor supports are positioned so that their axes lie substantially tangential with respect to a circle 44 whose center 45 preferably lies in an axis extending parallel to the engine crankshaft, which extends preferably through the center of gravity 15 of said engine, and is contained within the longitudinal central vertical engine plane that contains the crankshaft axis.

It will be apparent to those skilled in the art to which my invention pertains, that various modifications and changes may be made therein without departing from the spirit of my invention or from the scope of the appended claims.

I claim:

1. An aircraft engine mounting comprising yielding supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said longitudinal central engine plane, half of said supports located forward of the engine center of gravity and above the engine crankshaft while said other half of said supports are located rearwardly of the engine center of gravity and below the engine crankshaft.

2. An aircraft engine mounting comprising yielding supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said longitudinal central engine plane, half of said supports located forward of the engine center of gravity and above the engine crankshaft while said other half of said supports are located rearwardly of the engine center of gravity and below the engine crankshaft, said supports located in transverse engine planes extending normal to the engine crankshaft and substantially extending intermediate adjacent engine cylinders.

3. An aircraft engine mounting comprising yielding supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said longitudinal central engine plane, half of said supports located forward of the engine center of gravity and above the engine crankshaft while said other half of said supports are located rearwardly of the engine center of gravity and below the engine crankshaft, an engine supporting wall to the rear of the engine, and cantilever members anchored to said supporting wall at spaced points and hinged to said yielding supports, at least a pair of said cantilever members anchored to said wall at substantially the same point and connected respectively with a pair of said yielding supports.

4. An aircraft engine mounting comprising yielding supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said longitudinal central engine plane, half of said supports located forward of the engine center of gravity and above the engine crankshaft while said other half of said supports are located rearwardly of the engine center of gravity and below the engine crankshaft, an engine supporting wall to the rear of the engine, and cantilever members anchored to said supporting wall at spaced points and hinged to said yielding supports, at least a pair of said cantilever members hinged to the same yielding support and anchored to said supporting wall at spaced points.

5. An aircraft engine mounting comprising yielding supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said longitudinal central engine plane, half of said supports located forward of the engine center of gravity and above the engine crankshaft while said other half of said supports are located rearwardly of the engine center of gravity and below the engine crankshaft, an engine supporting wall to the rear of the engine, and cantilever members anchored to said supporting wall at spaced points and hinged to said yielding supports, at least a pair of said cantilever members hinged to the same yielding support and anchored to said supporting wall at laterally spaced points.

6. An aircraft engine mounting comprising yielding supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said longitudinal central engine plane, half of said supports located forward of the engine center of gravity in a plane extending normal to the engine crankshaft axis and lying generally above the engine crankshaft, while said other half of said supports are located rearwardly of the engine center of gravity in a plane also extending normal to the engine crankshaft axis and lying generally below the engine crankshaft, said planes in which the forward and rearward supports are respectively located being substantially equally longitudinally spaced from an engine transverse plane containing the engine center of gravity and extending normal to the engine crankshaft.

7. An aircraft engine mounting comprising yielding supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said longitudinal central engine plane, half of said supports located forward of the engine center of gravity and above the engine crankshaft while said other half of said supports are located rearwardly of the engine center of gravity and below the engine crankshaft, an engine supporting wall to the rear of said engine, and cantilever members anchored to said supporting wall at spaced points and hinged to said yielding supports, said cantilever members comprising separate tension struts connecting said supports to two laterally spaced points on said supporting wall above the horizontal central plane of the engine and to three laterally spaced points on said supporting wall below the horizontal central plane of the engine.

8. An aircraft engine mounting comprising yielding supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said longitudinal central engine plane, half of said supports located forward of the engine center of gravity and above the engine crankshaft while said other half of said supports are located rearwardly of the engine center of gravity and below the engine crankshaft, an engine supporting wall to the rear of said engine, and cantilever members anchored to said supporting wall at spaced points and hinged to said yielding supports, said cantilever members comprising separate tension struts connecting said supports to two laterally spaced points on said supporting wall above the horizontal central plane of the engine and to three laterally spaced points on said supporting wall below the horizontal central plane of the engine, said yielding supports forward of the engine center of gravity and above the engine crankshaft being connected only with said two spaced points on said supporting wall above the horizontal central plane of the engine while the yielding supports located to the rear of the engine center of gravity and below the engine crankshaft are connected to the two spaced points on said supporting wall above the horizontal central plane of the engine as well as to the three laterally spaced points on said supporting wall below the horizontal central plane of the engine.

9. An aircraft engine mounting comprising yielding supports having their axes positioned substantially tangentially relative to a circle with a center lying in a vertical longitudinal central engine plane containing the crankshaft axis, half of said supports located to one side of said vertical longitudinal central engine plane and the remaining supports located at substantially the same distance to the other side of said longitudinal central engine plane, half of said supports located forward of the engine center of gravity and above the engine crankshaft while said other half of said supports are located rearwardly of the engine center of gravity and below the engine crankshaft, an engine supporting wall to the rear of said engine, and cantilever members anchored to said supporting wall at spaced points and hinged to said yielding supports, said cantilever members comprising separate tension struts connecting said supports to two laterally spaced points on said supporting wall above the horizontal central plane of the engine and to three laterally spaced points on said supporting wall below the horizontal central plane of the engine, said yielding supports forward of the engine center of gravity and above the engine crankshaft being connected only with said two spaced points on said supporting wall above the horizontal central plane of the engine while the yielding supports located to the rear of the engine center of gravity and below the engine crankshaft are connected to the two spaced points on said supporting wall above the horizontal central plane of the engine as well as to the three laterally spaced points on said supporting wall below the horizontal central plane of the engine, the middle point of said three points on said supporting wall below the horizontal central plane of the engine being located in the vertical central engine plane containing the engine crankshaft and engine center of gravity, said middle point aforesaid connected by means of a pair of diverging tension struts to both said yielding supports located to the rear of the engine center of gravity.

CHARLES I. PRESTON.